(12) United States Patent
Susca et al.

(10) Patent No.: US 11,976,599 B1
(45) Date of Patent: May 7, 2024

(54) PUMPS WITH BACKUP CAPABILITY

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/084,768

(22) Filed: Dec. 20, 2022

(51) Int. Cl.
| | |
|---|---|
| *F02C 9/30* | (2006.01) |
| *F02C 7/236* | (2006.01) |
| *F04D 15/00* | (2006.01) |
| *F04D 15/02* | (2006.01) |

(52) U.S. Cl.
CPC ............... *F02C 9/30* (2013.01); *F02C 7/236* (2013.01); *F04D 15/0011* (2013.01); *F04D 15/0083* (2013.01); *F04D 15/0254* (2013.01); *F05D 2220/323* (2013.01); *F05D 2270/07* (2013.01); *F05D 2270/64* (2013.01)

(58) Field of Classification Search
CPC .. F02C 7/236; F02C 9/263; F02C 9/30; F02C 9/46; F23K 2300/20; F23K 2300/21; F23K 2400/20; F02M 37/18; F04D 13/12
See application file for complete search history.

(56) References Cited

U.S. PATENT DOCUMENTS

| | | | | |
|---|---|---|---|---|
| 2,506,611 | A * | 5/1950 | Neal | ........................ F02C 7/236 60/241 |
| 5,116,362 | A * | 5/1992 | Arline | ...................... F02C 7/236 60/734 |
| 5,806,300 | A * | 9/1998 | Veilleux, Jr. | ........... F02M 37/04 60/734 |
| 6,102,001 | A | 8/2000 | McLevige | |
| 6,487,847 | B1 | 12/2002 | Snow et al. | |
| 6,584,762 | B2 | 7/2003 | Snow et al. | |
| 8,128,368 | B2 | 3/2012 | Bielefedt | |
| 8,128,378 | B2 | 3/2012 | Rowan et al. | |
| 8,166,765 | B2 | 5/2012 | Baker et al. | |
| 8,172,551 | B2 | 5/2012 | Baker | |
| 8,192,172 | B2 | 6/2012 | Baker et al. | |
| 8,302,406 | B2 | 11/2012 | Baker | |
| 8,869,509 | B2 | 10/2014 | Baker | |
| 8,991,152 | B2 * | 3/2015 | Heitz | ....................... F02C 7/236 60/243 |
| 9,222,418 | B2 * | 12/2015 | Bader | ...................... F02C 7/236 |
| 9,574,500 | B2 | 2/2017 | Kelly et al. | |
| 9,617,923 | B2 | 4/2017 | Griffiths | |
| 9,657,643 | B2 * | 5/2017 | Veilleux, Jr. | ............. F02C 7/236 |

(Continued)

*Primary Examiner* — Alain Chau
(74) *Attorney, Agent, or Firm* — Kinney & Lange, P.A.

(57) ABSTRACT

A system includes a first pump connected to an inlet line and connected to a first outlet line for supplying a first subsystem over a first pressure schedule. A second pump is connected to the inlet line and connected to a second outlet line for supplying a second subsystem over a second pressure schedule. A backup selector is in fluid communication with the first and second outlet lines. The backup selector is configured to switch to a first backup mode to supply the first sub-system from the second pump upon failure of the first pump. The backup selector is configured to switch to a second backup mode to supply the second sup-system from the first pump upon failure of the second pump.

18 Claims, 3 Drawing Sheets

(56) References Cited

U.S. PATENT DOCUMENTS

| | | |
|---|---|---|
| 9,850,917 B2 | 12/2017 | Mueller et al. |
| 10,358,980 B2 * | 7/2019 | Morioka .................. F02C 7/236 |
| 11,203,978 B2 * | 12/2021 | O'Rorke ................. F02C 7/236 |
| 11,629,643 B1 * | 4/2023 | Susca ...................... F02C 7/236 |
| | | 60/206 |
| 2003/0074884 A1 * | 4/2003 | Snow ........................ F02C 9/48 |
| | | 60/764 |
| 2005/0100447 A1 | 5/2005 | Desai et al. |
| 2005/0262824 A1 * | 12/2005 | Yates ...................... F02C 7/232 |
| | | 60/39.281 |
| 2010/0037867 A1 * | 2/2010 | Kleckler ................. F02C 7/236 |
| | | 123/510 |
| 2010/0089025 A1 * | 4/2010 | Baker ...................... F02C 9/30 |
| | | 137/565.29 |
| 2010/0089026 A1 * | 4/2010 | Baker ...................... F02C 9/30 |
| | | 137/565.29 |
| 2011/0243772 A1 * | 10/2011 | Leblanc ................... F02C 9/30 |
| | | 417/426 |
| 2012/0186673 A1 * | 7/2012 | Heitz ...................... F02C 7/232 |
| | | 137/565.15 |
| 2012/0260658 A1 * | 10/2012 | Bader ...................... F02C 9/30 |
| | | 60/734 |
| 2012/0266600 A1 * | 10/2012 | Bader .................... F02C 7/236 |
| | | 60/734 |
| 2015/0101339 A1 * | 4/2015 | Veilleux, Jr. ........... F02C 7/236 |
| | | 60/734 |
| 2016/0169112 A1 * | 6/2016 | Morioka ................. F04D 13/06 |
| | | 60/735 |
| 2016/0201564 A1 * | 7/2016 | Oba ......................... F23K 5/04 |
| | | 137/565.3 |
| 2017/0292451 A1 * | 10/2017 | Reuter ...................... F02C 7/22 |
| 2017/0306856 A1 | 10/2017 | Bickley |
| 2018/0340501 A1 | 11/2018 | Ni et al. |
| 2019/0112987 A1 * | 4/2019 | O'Rorke ................... F02K 3/10 |
| 2020/0123986 A1 * | 4/2020 | Hahn ...................... G05B 6/02 |
| 2021/0079848 A1 * | 3/2021 | Cocks ..................... F02C 7/236 |
| 2021/0222625 A1 * | 7/2021 | O'Rorke ................. F02C 7/236 |
| 2022/0307491 A1 | 9/2022 | Rutar |

\* cited by examiner

PUMPS WITH BACKUP CAPABILITY

BACKGROUND

1. Field

The present disclosure relates to pump operation, and more particularly to backup functions for pumps such as in aerospace applications.

2. Description of Related Art

In order to minimize horsepower required for fuel pumping, variable displacement pumps (VDPs) are desirable. However, VDPs have higher part count than other pump types such as centrifugal pumps, so while VDPs can be made very reliable, they are not considered to be the most reliable type of pump. The reliability tradeoff of VDPs has heretofor driven some preclusions of their use in some applications, such as for single engine aircraft.

The conventional techniques have been considered satisfactory for their intended purpose. However, there is an ever present need for improved systems and methods for obtaining the horsepower benefits of VDPs without necessarily trading off reliability. This disclosure provides a solution for this need.

SUMMARY

A system includes a first pump connected to an inlet line and connected to a first outlet line for supplying a first sub-system over a first pressure schedule. A second pump is connected to the inlet line and connected to a second outlet line for supplying a second subsystem over a second pressure schedule. A backup selector is in fluid communication with the first and second outlet lines. The backup selector is configured to switch to a first backup mode to supply the first sub-system from the second pump upon failure of the first pump. The backup selector is configured to switch to a second backup mode to supply the second sup-system from the first pump upon failure of the second pump.

The backup selector can include a selector valve (SV) connected in fluid communication between the first outlet line and the second outlet line, wherein the SV is configured to block fluid communication between the first and second outlet lines in a normal mode, to allow fluid communication between the first and second outlet lines in the first backup mode, and to block fluid communication between the first and second outlet lines in the second backup mode. The backup selector can include a check valve (CV) connected in fluid communication between the first outlet line and the second outlet line, wherein the CV is configured to block fluid communication between the first and second outlet lines in the normal mode, to block fluid communication between the first and second outlet lines in the first backup mode, and to allow fluid communication from the first outlet line into the second outlet line in the second backup mode. The CV can connect upstream of where the SV connects in both the first outlet line and in the second outlet line, relative to flow in the normal mode.

The backup selector can include a check valve in the first outlet line between the first pump and where the CV an SV connect to the first outlet line, configured to black backflow into the first pump in the first backup mode. The backup selector can include a check valve in the second outlet line between the second pump and where the CV and SV connect to the second outlet line, configured to block backflow into the second pump in the second backup mode.

The first pump can be a variable displacement pump (VDP). An electrohydraulic servo valve (EHSV) can be operatively connected to a controller for control of the first pump. The EHSV can include a first connection to the inlet line, a second connection to the first outlet line, and a pump control line operatively connected to actuate a variable displacement mechanism of the VDP.

The second pump can be a variable displacement pump (VDP). An electrohydraulic servo valve (EHSV) can be operatively connected to a controller for control of the second pump. The EHSV can include a first connection to the inlet line, a second connection to the second outlet line, and a pump control line operatively connected to actuate a variable displacement mechanism of the VDP.

The first pressure schedule can have a high pressure that is lower than a high pressure of the second schedule. The first pump can be configured to supply a gas generator as the first sub-system, wherein the second pump is configured to supply an actuation system as the second sub-system.

A metering valve (MV) can be connected to the first outlet line to step down pressure from the second output line down to a third pressure below a second pressure of the first outlet line. The MV can include a piston configured to meter flow from the first outlet line to a line at the third pressure based on position of the piston in a valve sleeve.

An electrohydraulic control valve (EHSV) can be operatively connected to a controller, to the inlet line, and to the first outlet line. The EHSV can include a first control line connected to a first end of the piston, and a second control line connected to a second end of the piston. The EHSV can be configured to pressurize the first and second control lines to control position of the piston based on commands from the controller. The MV can include a position sensor operatively connected to generate feedback indicative of position of the piston in the sleeve. The controller can be operatively connected to the position sensor to control the MV based on the feedback indicative of position of the piston in the sleeve.

A pressure regulating valve (PRV) can be connected to a line at the third pressure from the MV to receive flow from the MV, and an outlet configured to output regulated pressure flow to a regulated pressure flow line based on position of a regulating piston in a regulating piston sleeve. A first end of the regulating piston can be connected to the line at the third pressure from the MV, and wherein a second end of the regulating piston is connected to the first outlet line so position of the regulating piston in the regulating sleeve is based on pressure differential between the second and third pressures.

A shutoff valve (SOV) can be connected in a line from the outlet of the PRV, wherein the SOV is configured to block flow from the PRV below a predetermined threshold for shutoff. A controller can be operatively connected to control each of the first and second pumps based on feedback from a first sensor operatively connected to communicate feedback indicative of pressure in the first outlet line to the controller and from a second sensor operatively connected to communicate feedback indicative of pressure in the second outlet line to the controller. The first pump can be sized to have at least 40% greater capacity than needed for full power of the first sub-system, and the second pump can be sized to have at least 40% greater capacity than needed for full power of the second sub-system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
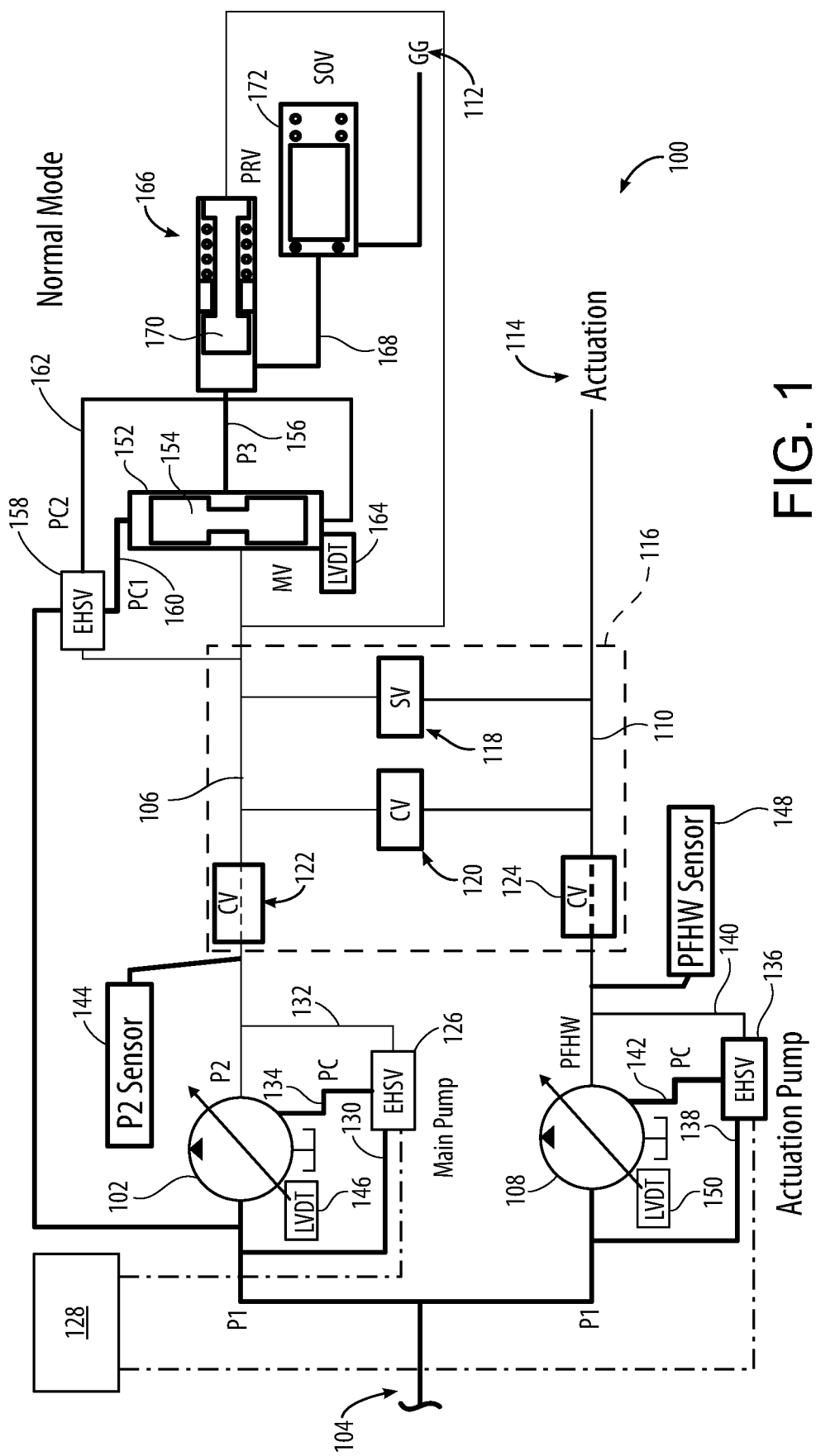
FIG. 1 is a schematic view of an embodiment of a system constructed in accordance with the present disclosure, showing the pumps operating in normal mode.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3 as will be described. The systems and methods described herein can be used to provide backup capabilities for pump redundancy, e.g. enabling the benefits of variable displacement pumps (VDPs) in applications where traditionally VDPs could not be used.

The system 100 includes a first pump 102 connected to an inlet line 104 and connected to a first outlet line 106 for supplying a first sub-system 112, e.g. a gas generator of a gas turbine in engine as indicated by GG in FIG. 1, over a first pressure schedule. A second pump 108 is connected to the inlet line 104 and is connected to a second outlet line 110 for supplying a second subsystem 114, e.g. a hydraulic actuation system of hydraulic actuated devices, over a second pressure schedule. The first pressure schedule can have its highest pressure be lower than the highest pressure of the second schedule. It is also contemplated that the second pressure schedule can be fully above the pressure range of the first pressure schedule.

A backup selector 116 is in fluid communication with the first and second outlet lines 106, 110. The backup selector 116 is configured to switch to a first backup mode, shown in FIG. 2, to supply the first sub-system 112 from the second pump 108 upon failure of the first pump 102. The backup selector 116 is configured to switch to a second backup mode to supply the second sup-system 114 from the first pump 102 upon failure of the second pump 108, as shown in FIG. 3.

The backup selector includes a selector valve (SV) 118 connected in fluid communication between the first outlet line 106 and the second outlet line 110. The SV 118 can be any suitable type of selector valve such as a solenoid valve. The SV 118 is configured to block fluid communication between the first and second outlet lines 106, 110 in a normal mode as shown in FIG. 1, to allow fluid communication between the first and second outlet lines 106, 110 in the first backup mode shown in FIG. 2, and to block fluid communication between the first and second outlet lines 106, 110 in the second backup mode shown in FIG. 3. The backup selector 116 includes a check valve (CV) 120 connected in fluid communication between the first outlet 106 line and the second outlet line 110. The CV 120 is configured to block fluid communication between the first and second outlet lines 106, 110 in the normal mode as shown in FIG. 1, to block fluid communication between the first and second outlet lines 106, 110 in the first backup mode shown in FIG. 2, and to allow fluid communication from the first outlet line into the second outlet line 106, 110 in the second backup mode shown in FIG. 3. The CV 120 connects upstream of where the SV 118 connects in both the first outlet line 106 and in the second outlet line 110, relative to flow in the normal mode of FIG. 1. The CV 120 can actuate passively to allow flow therethrough only when the pressure in the first outlet line 106 is higher than the pressure in the second outlet line 110, e.g. in the second backup mode shown in FIG. 3.

The backup selector 116 includes a check valve 122 in the first outlet line 106 between the first pump 102 and where the CV 120 an SV 118 connect to the first outlet line 106. The check valve 122 is configured to black backflow into the first pump 102 in the first backup mode of FIG. 2, e.g. where the first pump 102 is degraded or failed. The backup selector 116 includes a check valve 124 in the second outlet line 110 between the second pump 108 and where the CV 120 and SV 118 connect to the second outlet line 110. The check valve 124 is configured to block backflow into the second pump 108 in the second backup mode shown in FIG. 3, e.g. where the second pump 108 is degraded or failed.

The first pump 102 is a variable displacement pump (VDP). An electrohydraulic servo valve (EHSV) 126 is operatively connected to a controller 128 for control of the first pump 102. The EHSV 126 includes a first connection 130 to the inlet line 104, a second connection 132 to the first outlet line 106, and a pump control line 134 operatively connected to actuate a variable displacement mechanism of the first pump 102. The second pump 108 is a variable displacement pump (VDP). An EHSV 136 is operatively connected to the controller 128 for control of the second pump 108. The EHSV 136 includes a first connection 138 to the inlet line 104, a second connection 140 to the second outlet line 110, and a pump control line 142 operatively connected to actuate a variable displacement mechanism of the second pump 108. A first pressure sensor 144 is included in the first outlet line 106, and the first pump 102 includes a sensor 146, e.g. a linear variable displacement transformer (LVDT) connected to the variable displacement mechanism of the first pump 102. Each of the sensors 144, 146 are connected to the controller 128 for feedback control of the first pump. Similarly, a second pressure sensor 148 is included in the second outlet line 110, and the second pump 108 includes a sensor 150, e.g. a linear variable displacement transformer (LVDT) 146 connected to the variable displacement mechanism of the second pump 108. Each of the sensors 144, 146 are connected to the controller 128 for feedback control of the first pump. The connections of the sensors 144, 146, 148, 150 to the controller 128 are deliberately omitted in FIGS. 1-3 to avoid obscuring the fluid lines.

A metering valve (MV) 152 is connected to the first outlet line 106 to step down pressure from the second output line down to a third pressure P3 below a second pressure P2 of the first outlet line 106. This allows operation of the two different pressure schedules of the subsystems 112, 114 in the event of one-pump operation as in the backup modes of FIGS. 2-3. The MV 152 includes a piston 154 configured to meter flow from the first outlet line 106 to a line 156 at the third pressure P3 based on position of the piston 154 in a valve sleeve of the MV 152.

An EHSV 158 is operatively connected to the controller 128, to the inlet line 104, and to the first outlet line 106. The EHSV 158 includes a first control line 160 connected to a first end of the piston 152, and a second control line 162 connected to a second end of the piston 154. The EHSV 158 is configured to pressurize the first and second control lines 160, 162 to control position of the piston 154 based on commands from the controller 128. The MV 152 includes a position sensor 164, e.g. an LVDT, operatively connected to generate feedback indicative of position of the piston 154 in the sleeve for the controller 128. The controller 128 is operatively connected to the position sensor 164 to control the MV 152 based on the feedback indicative of position of the piston 154 in its sleeve.

A pressure regulating valve (PRV) 166 is connected to the line 156 at the third pressure P3 from the MV 152 to receive flow from the MV 152, and an outlet configured to output regulated pressure flow to a regulated pressure flow line 168 based on position of a regulating piston 170 in a regulating piston sleeve of the PRV 166. A first end of the regulating piston 170 is connected to the line 156 from the MV 152. The second end of the regulating piston 170 is connected to the first outlet line 106 so the position of the regulating piston 170 in its sleeve is based on pressure differential between the second and third pressures P2 and P3. A shutoff valve (SOV) 172 is connected in the line 168 from the outlet of the PRV 166, wherein the SOV 172 is configured to block flow from the PRV 166 below a predetermined threshold for shutoff, to prevent flow to/from the subsystem 112, e.g. while the system 100 is shut off.

Figure 2:
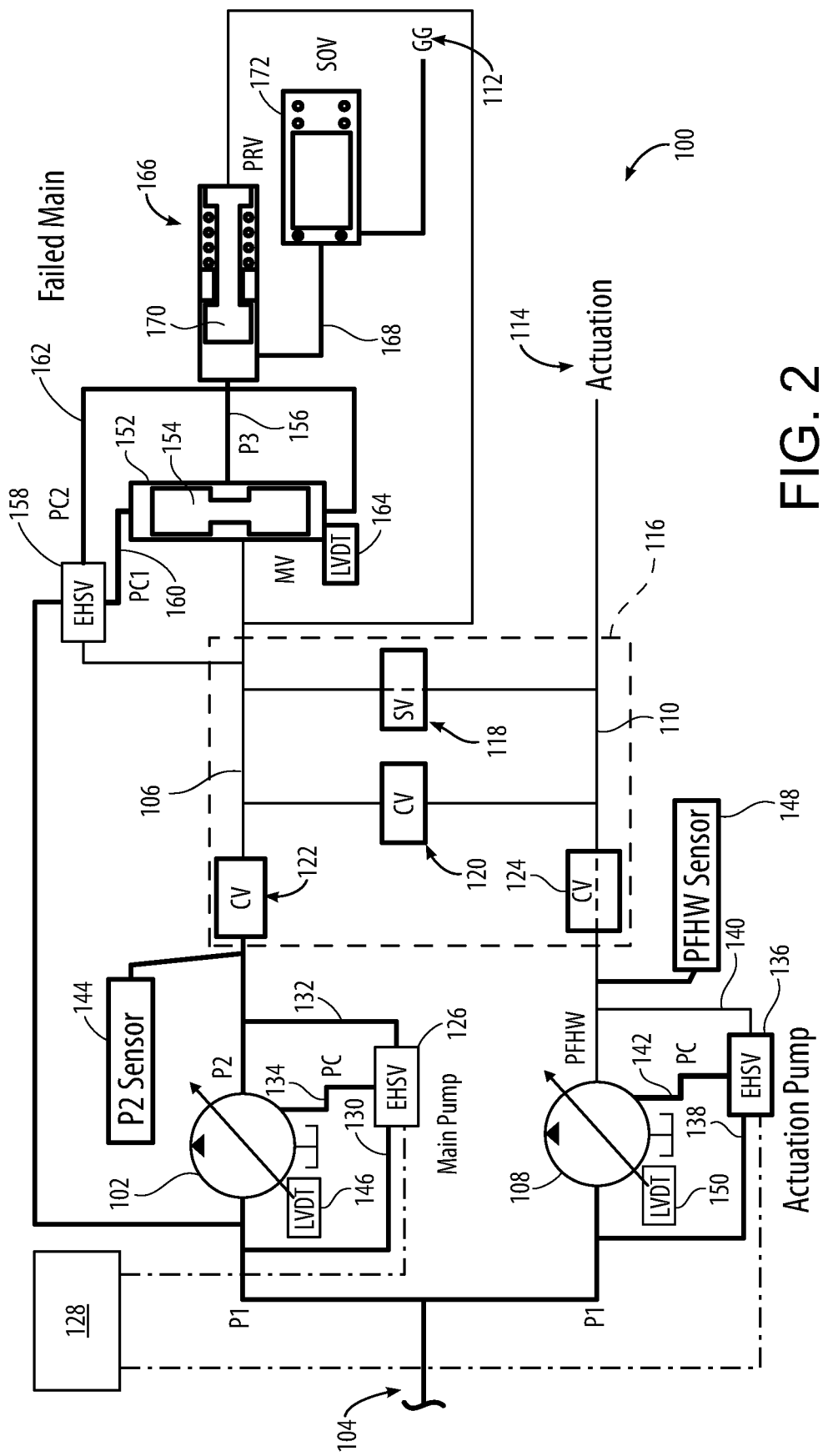
FIG. 2 is a schematic view of the system of FIG. 1, showing the first backup mode.
Figure 3:
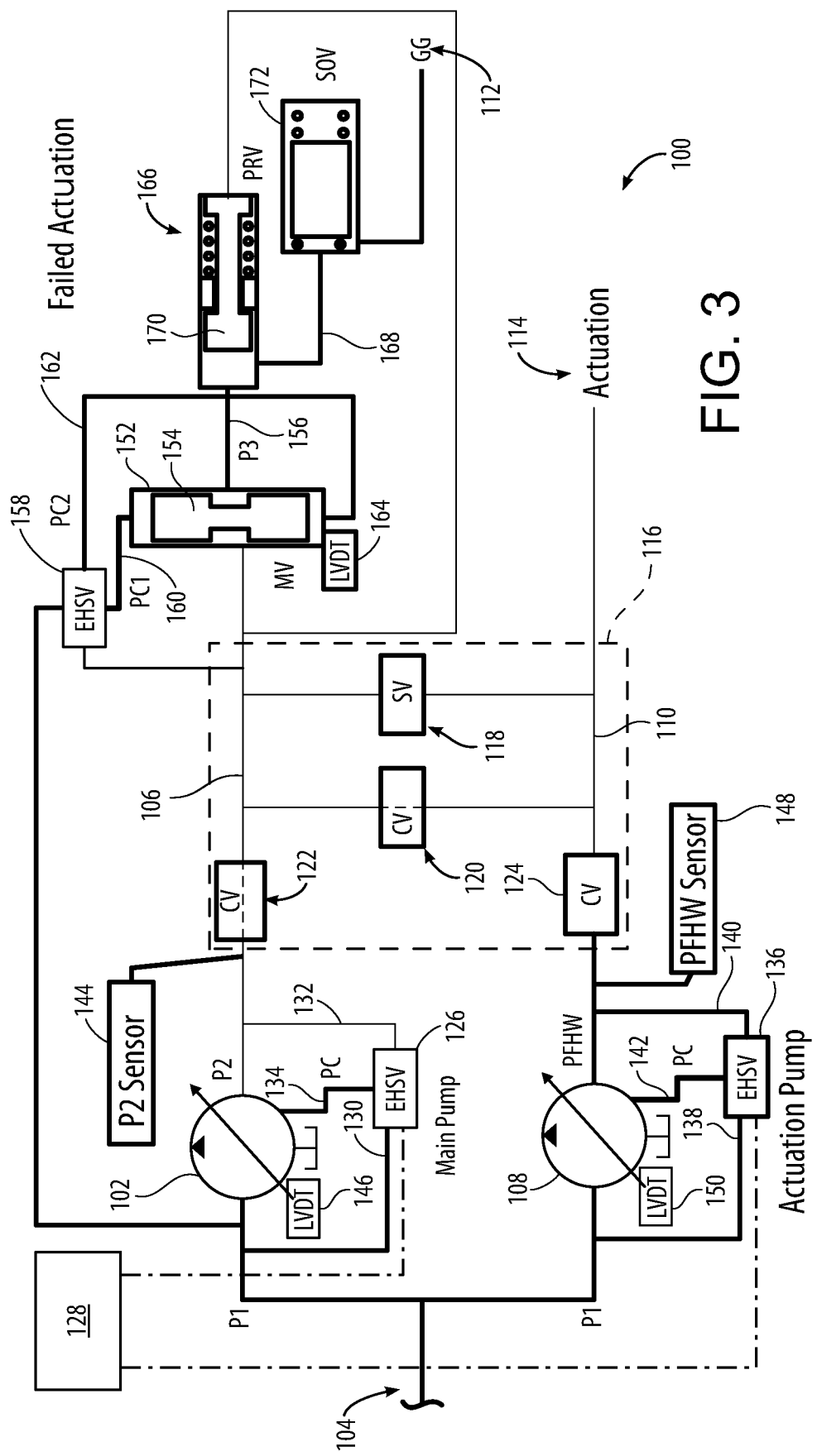
FIG. 3 is a schematic view of the system of FIG. 1, showing the second backup mode.

The controller 128 is operatively connected to control each of the first and second pumps in the normal mode of FIG. 1 and in the backup modes of FIGS. 2-3 based on feedback from the first sensor 144 operatively connected to communicate feedback indicative of pressure in the first outlet line 106 to the controller, and from the second sensor 148 operatively connected to communicate feedback indicative of pressure in the second outlet line 110 to the controller 128. The controller 128 is also operatively connected for active control of the SV 118 for switching among the modes described herein.

The first and second pumps 102, 108 can each be oversized, e.g., to have at least 40% greater capacity than needed for full power of their respective sub-systems during normal operation as shown in FIG. 1. This over-sizing for the normal mode helps ensure when only one pump is running in the backup modes of FIGS. 2-3, both sub-systems 112, 114 have adequate pressure for continued operation.

Systems and methods as disclosed herein offer various potential benefits. They can improves fuel system reliability, can provides pump back-up capability, and can offer cost savings since both pumps can be identical to one another.

The methods and systems of the present disclosure, as described above and shown in the drawings, provide for backup capabilities for pump redundancy, e.g. enabling the benefits of variable displacement pumps (VDPs) in applications where traditionally VDPs could not be used. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a first pump connected to an inlet line and connected to a first outlet line for supplying a first sub-system over a first pressure schedule;
   a second pump connected to the inlet line and connected to a second outlet line for supplying a second subsystem over a second pressure schedule; and
   a backup selector in fluid communication with the first and second outlet lines,
   wherein the backup selector is configured to switch to a first backup mode to supply the first sub-system from the second pump upon failure of the first pump,
   wherein the backup selector is configured to switch to a second backup mode to supply the second sub-system from the first pump upon failure of the second pump;
   wherein the backup selector includes a selector valve (SV) connected in fluid communication between the first outlet line and the second outlet line, wherein the SV is configured
   to block fluid communication between the first and second outlet lines in a normal mode,
   to allow fluid communication between the first and second outlet lines in the first backup mode, and
   to block fluid communication between the first and second outlet lines in the second backup mode; and
   wherein the backup selector includes a check valve (CV) connected in fluid communication between the first outlet line and the second outlet line, wherein the CV is configured
   to block fluid communication between the first and second outlet lines in the normal mode,
   to block fluid communication between the first and second outlet lines in the first backup mode, and
   to allow fluid communication from the first outlet line into the second outlet line in the second backup mode.

2. The system as recited in claim 1, wherein the CV connects upstream of where the SV connects in both the first outlet line and in the second outlet line, relative to flow in the normal mode.

3. The system as recited in claim 2, wherein the backup selector includes:
   a check valve in the first outlet line between the first pump and where the CV an SV connect to the first outlet line, configured to block backflow into the first pump in the first backup mode; and
   a check valve in the second outlet line between the second pump and where the CV and SV connect to the second outlet line, configured to block backflow into the second pump in the second backup mode.

4. The system as recited in claim 1, wherein the first pump is a variable displacement pump (VDP).

5. The system as recited in claim 4, further comprising an electrohydraulic servo valve (EHSV) operatively connected to a controller for control of the first pump, wherein the EHSV includes a first connection to the inlet line, a second connection to the first outlet line, and a pump control line operatively connected to actuate a variable displacement mechanism of the VDP.

6. The system as recited in claim 1, wherein the second pump is a variable displacement pump (VDP).

7. The system as recited in claim 6, further comprising an electrohydraulic servo valve (EHSV) operatively connected to a controller for control of the second pump, wherein the EHSV includes a first connection to the inlet line, a second connection to the second outlet line, and a pump control line operatively connected to actuate a variable displacement mechanism of the VDP.

8. The system as recited in claim 1, wherein the first pressure schedule has a high pressure that is lower than a high pressure of the second schedule.

9. The system as recited in claim 8, wherein the first pump is configured to supply a gas generator as the first sub-system, wherein the second pump is configured to supply an actuation system as the second sub-system.

10. The system as recited in claim 1, further comprising a metering valve (MV) connected to the first outlet line to step down pressure from the second output line down to a third pressure below a second pressure of the first outlet line.

11. The system as recited in claim 10, wherein the MV includes a piston configured to meter flow from the first outlet line to a line at the third pressure based on position of the piston in a valve sleeve.

12. The system as recited in claim 11, further comprising:
an electrohydraulic control valve (EHSV) operatively connected to a controller, to the inlet line, and to the first outlet line, wherein the EHSV includes a first control line connected to a first end of the piston, and a second control line connected to a second end of the piston, wherein the EHSV is configured to pressurize the first and second control lines to control position of the piston based on commands from the controller.

13. The system as recited in claim 12, wherein the MV includes a position sensor operatively connected to generate feedback indicative of position of the piston in the sleeve, wherein the controller is operatively connected to the position sensor to control the MV based on the feedback indicative of position of the piston in the sleeve.

14. The system as recited in claim 10, further comprising a pressure regulating valve (PRV) connected to a line at the third pressure from the MV to receive flow from the MV, and an outlet configured to output regulated pressure flow to a regulated pressure flow line based on a position of a regulating piston in a regulating piston sleeve.

15. The system as recited in claim 14, wherein a first end of the regulating piston is connected to the line at the third pressure from the MV, and wherein a second end of the regulating piston is connected to the first outlet line so the position of the regulating piston in the regulating sleeve is based on pressure differential between the second and third pressures.

16. The system as recited in claim 15, further comprising a shutoff valve (SOV) connected in a line from the outlet of the PRV, wherein the SOV is configured to block flow from the PRV below a predetermined threshold for shutoff.

17. The system as recited in claim 1, further comprising a controller operatively connected to control each of the first and second pumps based on feedback from a first sensor operatively connected to communicate feedback indicative of pressure in the first outlet line to the controller and from a second sensor operatively connected to communicate feedback indicative of pressure in the second outlet line to the controller.

18. The system as recited in claim 1, wherein the first pump is sized to have at least 40% greater capacity than needed for full power of the first sub-system, and wherein the second pump is sized to have at least 40% greater capacity than needed for full power of the second sub-system.

* * * * *